United States Patent [19]
Hickham

[11] Patent Number: 5,125,147
[45] Date of Patent: Jun. 30, 1992

[54] METHOD FOR REPAIRING FIBERGLASS AND LIKE FISHING RODS

[76] Inventor: David A. Hickham, 1801 Bayou Black Dr., Houma, La. 70360

[21] Appl. No.: 722,951

[22] Filed: Jun. 28, 1991

[51] Int. Cl.$^5$ .............................................. B23P 7/00
[52] U.S. Cl. .............................. 29/402.09; 29/402.18; 43/18.1
[58] Field of Search ................ 43/18.1, 18.5; 29/402.01, 402.09, 402.18; 186/293, 294; 285/15, 66, 292; 403/11, 289, 292, 265, 405.1

[56] References Cited
U.S. PATENT DOCUMENTS

| | | | |
|---|---|---|---|
| 2,600,629 | 6/1952 | Feierabend | 29/402.09 X |
| 3,616,516 | 11/1971 | Corriston | 29/402.18 X |
| 3,878,012 | 4/1975 | Williams | 29/402.09 X |
| 4,175,311 | 11/1979 | Bunyan | 29/402.18 |

*Primary Examiner*—Timothy V. Eley
*Attorney, Agent, or Firm*—Pravel, Gambrell, Hewitt, Kimball & Krieger

[57] ABSTRACT

A repair system for tapered fishing rods (such as fiberglass, composite or the like) uses a hollow tubular member with a bore of uniform cylindrical shape that is first applied to the larger broken section of the rod. The bore of the tubular member is filled with a settable fluid or paste such as an epoxy. The smaller broken section is then placed into the bore. When the settable material hardens, a repair is achieved.

3 Claims, 2 Drawing Sheets

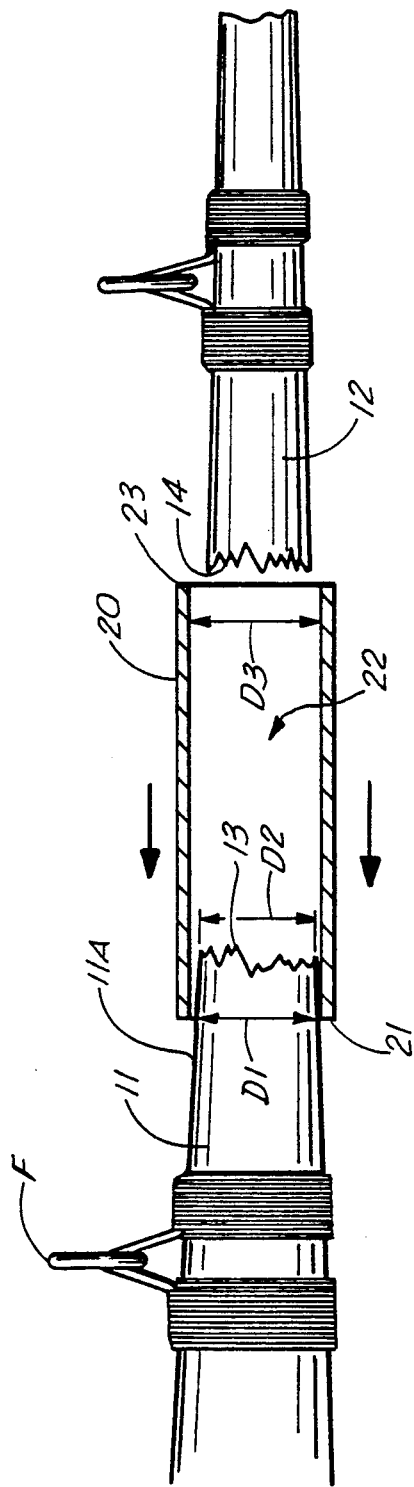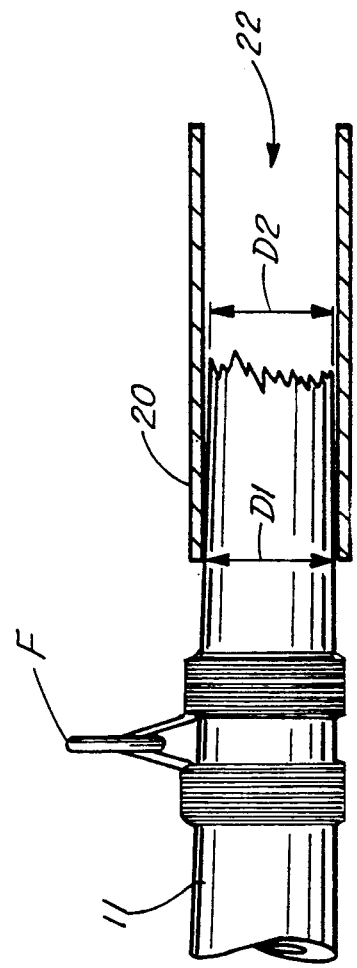

METHOD FOR REPAIRING FIBERGLASS AND LIKE FISHING RODS

BACKGROUND OF THE INVENTION

1. Field of the Invention

The present invention relates to methods for repairing broken fishing rods and more particularly relates to an improved method and apparatus for the repair of fiberglass and like fishing rods that are tapered between the butt end of the rod and the tip end of the rod. Even more particularly, the present invention relates to the repair of a tapered fishing rod that is fractured, wherein a uniform cylindrical sleeve is placed over the fracture site on a large tapered section at the break, and covering the fracture site and wherein an epoxy filler is injected into the void space between the large tapered section and the sleeve with the smaller tapered section being placed into the sleeve bore once filled with epoxy and thereafter the epoxy is allowed to set.

2. General Background

There are a number of manufacturers of fishing rods that manufacture rods of a fiberglass construction. Further, there are many composite rods which behave similarly to a fiberglass fishing rod but which contain a number of materials such as a composite type rod. These fishing rods must maintain a desirable flexibility and sensitivity if they are to operate properly. When a fishing rod breaks in half, it usually is rendered useless because the user has no way of rejoining the fiberglass sections together. At the fracture site, the rod typically frays and produces an uneven, heterogeneous interface which is not easily joined by glue or other adhesives. Fishing rods are very long in relation to their diameter so that the bending strength of the rod is dependent upon a very uniform loading between the butt end of the rod and the tip end of the rod and wherein the central axis of the rod is maintained as a straight linear path.

There have been attempts to solve the problem of repairing broken fishing rods. U.S. Pat. No. 3,389,046 issued to R. M. Burgess and entitled "Tubular Repair Joint and Insert Used Therein" relates to a method and apparatus for repairing hollow glass-fiber fishing rods without impairing the resiliency of the rod. An insert comprising a resilient metal core covered with continuous glass fibers and coated with a self-curing resin is fitted within the hollow shafts of the fishing rod and the shaft sections are then pushed into an abutting relationship. The Burgess reference requires that the rod be hollow because the repair member is placed internally of the rod. The repair member is inserted at the fracture site, partially into the larger tapered section and partially into the smaller tapered section. Then the tapered sections of the rod are joined with the fracture site of each broken section abutting. The problem with the Burgess reference is that it contemplates a hollow rod which is not always the case. Further, it would only be feasible with rods having sufficient diameter to accommodate the repair member must fit within the bore of the rod which is by definition smaller than the outer diameter of the rod.

U.S. Pat. No. 3,878,012 entitled "Device and Method for Fishing Rod Repair" relates to a repair device and method facilitating rejoining of two broken pieces of a hollowed tapered fishing rod. The device includes an insert that is tapered similarly to the taper within the interior bore of the broken rod. An enlarged end of the insert is provided with a number of longitudinal slots extending from that end toward a reduced end. The slots allow radial compression of the enlarged end to enable its insertion within the broken rod. The insert includes, at some point along its length, a cross-sectional exterior diameter substantially equal to the diameter of the rod bore at the break point. The insert is situated within the rod bore so that the complementary cross sectional diameters are aligned, thereby providing a surface to fit between the exterior of the insert and the interior of the rod bore. The insert fits within the broken sections so that approximately half the length of the insert is engaged within each broken section, the broken ends being butted together to complete the repair. A hollow sleeve is also provided to insure surface to surface engagement of the exterior surface of the insert with the interior surface or wall of the bore. The sleeve is tapered similarly to the interior bore of the insert so it may be slideably adjusted within the bore of the insert to urge the compressible sections of the enlarged insert end outwardly against the walls of the rod bore.

The William's device is similar to the aforementioned Burress patent in that it contemplates an internal hollow section of the fishing rod to which a portion of the insert is attached. Thus, Burgess will not function to repair sections of a broken fishing rod wherein there is no internal bore for attachment of the repair member thereto. Further, Williams requires a tapered repair member which is expensive, providing multiple longitudinal cuts as part of its construction, raising manufacturing costs.

U.S. Pat. No. 3,310,903 entitled dismountable fishing rod discusses a telescopic fishing rod made up of tapered elements connectable together. The apparatus is in the form of a hollow fishing rod having progressively decreasing conical cross sections from end to end and open at its larger end. This produces a plurality of frustro-conical core elements of varying length and complimentary to interior portions along the length of the hollow fishing rod.

There are a number of patents that relate generally to demountable structures and to methods of joining pipe and tubing. For example, the Pearson U.S. Pat. No. 2,813,818 entitled "Method of Making a Demountable Bow" discusses a connection between both sections and includes sleeve members.

The Harrison U.S. Pat. No. 2,992,457 entitled "Method of Joining Pipe and Tubing" utilizes a tapered sleeve section in connection with joining sections of sewer pipe together.

The Byrne et al. U.S. Pat. No. 4,043,857 entitled "Method of Joining Plastic Pipe" relates to the use of a sleeve for joining ends of plastic pipe of uniform diameter. One embodiment uses an internal sleeve and an external sleeve as part of the assembly.

The Kemper et al. U.S. Pat. No. 4,660,867 entitled "Coupled Hose Assembly" provides a hose assembly coupling that uses a stab fitting having annular serations.

The Born et al. U.S. Pat. No. 4,923,540 relates to a method of joining two beveled rod ends composed of plastic material reinforced with long fibers, and using a shrinkable tube.

These later patents are not directed to the problem of repairing a fiberglass or like fishing rod but rather relate to general assemblies that employ tubular members and sleeves.

SUMMARY OF THE PRESENT INVENTION

The present invention provides an improved method and apparatus for repairing a broken section of a tapered fishing rod wherein a larger tapered section and a smaller tapered section are to rejoined at a fracture site.

The method contemplates the use of a kit of cylindrical sleeves with a sleeve internal wall defining a uniform internal diameter sleeve bore that is placed over the larger tapered section to cover the fracture site. One end portion of the sleeve bore covers an end of the large tapered section at the fracture site and is tightly engaged so that the sleeve internal wall engages the outer surface of the large tapered section at a positioned spaced from the fracture site. The void space between the sleeve and the large tapered section is filled with an epoxy filler. The smaller tapered section is placed into the sleeve bore. The fracture end of both the large and small tapered sections is abutted and the epoxy filler is allowed to set. Because the sleeves are provided in kit form, the user can select a sleeve that closely approximates the external diameter of the larger tapered section a distance spaced away from the fracture site so that the fracture site is placed at about the middle of the sleeve. Therefore, by providing the sleeves in kit form, the user can very quickly select the perfectly sized sleeve to complete the fracture. The void space is then filled with an epoxy and the smaller diameter tapered section is placed into the sleeve and the fractured ends abutted. This allows the user to completely encapsulate the fracture site and the end of each tapered section with epoxy. When the epoxy has set, the sleeve and epoxy form a tight yet somewhat flexible connection that allows the fishing rod to continue to function properly within a few minutes after the repair is completed. This is of great utility to fisherman in that they can repair very expensive rods on site with minimum expense and with minimum time lost.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a side sectional view of the preferred embodiment of the apparatus of the present invention illustrating selection of a sleeve size;

FIG. 2 is a sectional view illustration the method of the present invention and the application of a selected sleeve to the large tapered section of the fishing rod;

DETAILED DESCRIPTION OF THE PREFERRED EMBODIMENT

Figure 3:
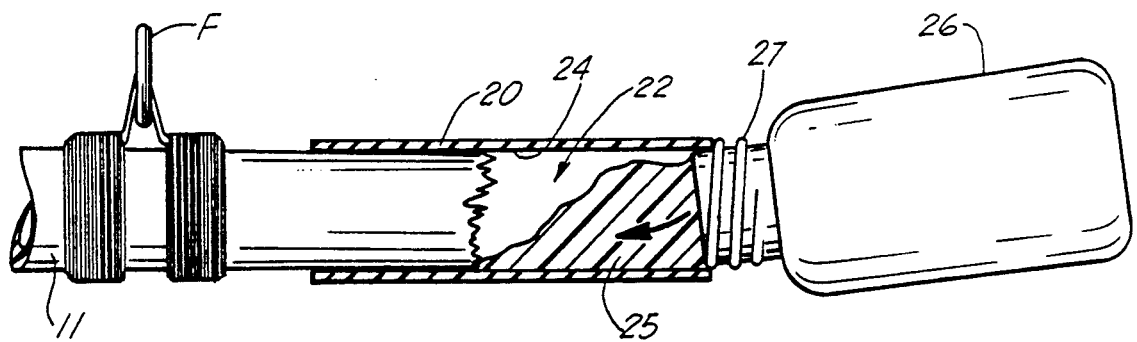
FIG. 3 is a sectional view illustrating addition of epoxy filler to the sleeve bore and about the large tapered section.

FIGS. 1-5 illustrate the method of the present invention. In FIG. 1, there can be seen two sections of a fishing rod including a large tapered section 11 and a small tapered section 12. A fracture site is defined by the frayed end 13 of large tapered section 11 and the frayed end 14 of the small tapered section 12. The diameter and tapers of the respective fishing rod sections 11, 12 are exaggerated for the purposes of illustration. Each tapered section 11, 12 can have one or more line ferrules F. Because the line ferrules reinforce the rod in their immediate vicinity, the fracture site 13, 14 typically is spaced away from the ferrules F. In FIG. 2, the large tapered section 11 is shown with a selected sleeve 20 being placed thereon. Because the section 11 is tapered, the diameter D2 at end 21 of sleeve 20 is larger than the diameter D2 at the fracture site 13.

The sleeve 20 is uniform and cylindrical, providing an internal bore 22 of uniform internal diameter D3. Thus, the internal diameter D3 of bore 22 is defined by intercylindrical wall 24 of sleeve 20. This internal wall 24 at end 21 closely fits and registers against the outside surface 11A of large tapered section 11 as shown in FIG. 2. In this manner, the selected sleeve 20 can be dimensioned so as to fit approximately half-way onto large tapered section 11 with the end 21 fitting tightly against the outer surface 11A as shown in FIG. 2. This forms a seal for preventing the escape of epoxy from sleeve bore 22 at end 21. The end 23 of sleeve 20 is an open end through which epoxy filler 25 can be added using a collapsible tube 26 for example as shown in FIG. 3. The dispensing end 27 of the tube 26 is simply placed against the open end 23 of sleeve 20 and the tube 26 squeezed so that the epoxy contents fill the bore 22 of sleeve 20 as shown in FIG. 3. The void space is now defined as the area around enlarged end 11 and in the bore 22 of sleeve 20, namely that portion of the bore between ends 21 and 23.

Figure 4:
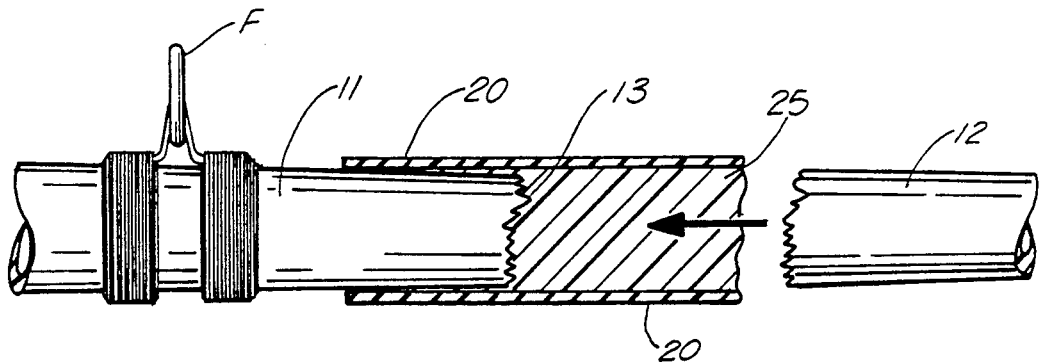
FIG. 4 is a sectional view illustrating assembly of the large and small tapered sections into the sleeve bore filled with epoxy.

In FIG. 4, the bore 22 has been filled with epoxy filler 25 and small tapered section 22 of the fishing rod is placed into the bore 22 as shown in FIG. 4 in the direction of arrow 28 until the fracture sites 13, 14 abut.

Figure 5:
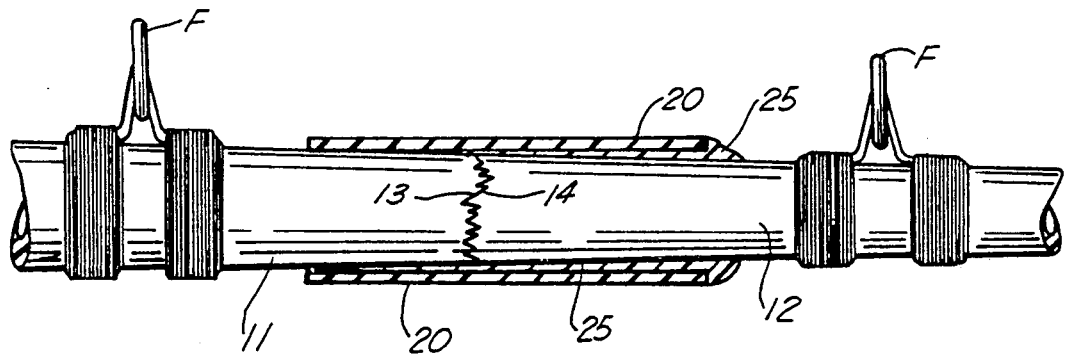
FIG. 5 is a sectional view illustrating a completed repair of the broken fishing rod.

This method allows epoxy to completely encapsulate the ends 11, 12 within bore 22 of sleeve 20 including an encapsulation of the frayed ends 13, 14 defining the fracture site. Further, the epoxy flows around the smaller tapered section 12 encapsulating same as shown in the completed repair of FIG. 5. Some epoxy may flow outside of the sleeve 20 adjacent end 23 as shown in FIG. 5. Epoxy can be applied directly to the rod sections prior to placement into the bore 22 of the sleeve 20. The sleeve bore 20 can be coated with epoxy. The epoxy 25 can be of a type that has a certain flexibility so that the epoxy filler 25 slightly flexes during use to help maintain flexibility of the rod sections 11, 12. It has been found that sleeves of a cylindrical brass construction worked desirably, having a wall thickness of about fourteen thousandths of an inch.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of repairing a broken section of a tapered fishing rod having a plurality of rod eyes wherein a larger tapered section, and a smaller tapered section with a tip, are to be rejoined at a fracture site, comprising the steps of:
    a) placing a cylindrical sleeve with a sleeve internal wall defining a uniform internal diameter sleeve bore over the larger tapered section to cover the fracture site so that one end portion of the sleeve bore covers an end of the large tapered section at the fracture site;

b) tightly engaging one end of the sleeve internal wall with the outer surface of the large tapered section;

c) filling the void space between the sleeve and the large tapered section with an epoxy filler;

d) placing the smaller tapered section into the bore of the sleeve with the fracture end of the large and small tapered sections abutting at the central portion of the sleeve;

e) aligning the rod sections, rod eyes and rod tip;

f) allowing the epoxy filler to set.

2. The method of claim 1 wherein the sleeve is between three quarters and three inches in length.

3. The method of claim 1 wherein in step "a" the sleeve is selected from a kit containing an inventory of sleeves of variable diameters.

* * * * *